Dec. 12, 1950 L. SOBIE 2,533,967
AUTOMATIC THROTTLE CONTROL
Filed Dec. 28, 1948 2 Sheets-Sheet 1

INVENTOR.
LEO SOBIE
BY
Beaman Patch
ATTORNEYS

INVENTOR.
BY LEO SOBIE
Beaman & Patch
ATTORNEYS

Patented Dec. 12, 1950

2,533,967

UNITED STATES PATENT OFFICE 2,533,967

AUTOMATIC THROTTLE CONTROL

Leo Sobie, Jonesville, Mich.

Application December 28, 1948, Serial No. 67,657

3 Claims. (Cl. 192—.084)

This invention relates to clutch actuated throttle control devices for farm tractors and particularly to an automatic clutch actuated throttle control or idler for a particular type tractor.

The main object of my invention is to provide a tractor with means for automatically throttling down and slowing the motor of the tractor whenever the latter is relieved of its normal load.

Another object is to provide such a tractor with a throttle control device which automatically takes over and idles the motor when the clutch of the tractor is dis-engaged.

A further object is to have a throttle control device upon a tractor as indicated, which is connected to and operated by the clutch pedal of the tractor and effective to prevent racing of the motor when the clutch is dis-engaged by depression of the pedal.

It is also an object of the invention to provide a throttle control device of the indicated character which may be applied to a tractor in the form of an attachment without the necessity of rebuilding the tractor motor or casing structure.

It is likewise an object to have the tractor equipped with automatic throttle control means serving to control the operation of the motor without moving the throttle by hand so as thereby to leave both hands free to shift gears, adjust levers and/or operate the hydraulic control.

Other objects and various advantages of the invention will appear in further detail as the specification proceeds.

In order to facilitate ready comprehension of this invention for a proper appreciation of the salient features thereof, the invention is illustrated on the accompanying drawings forming part hereof, and in which.

In the views the same reference numerals indicate the same parts.

On farm tractors, it frequently occurs during the course of each day that the clutch is released for stopping or changing the operation of the tractor by shifting gears, and operating levers and also performing various required manipulations, while the motor continues running throughout. In fact not only does the motor continue to run, but as the clutch is dis-engaged, the motor is free from its load and immediately starts to race. To be sure this occurs only during the short intervals when the clutch is released, but as this actually takes place many times during the day, such occurrences add up to a considerable period of time in the aggregate during which the motor is racing, thereby shortening its life and also wasting fuel.

Upon carefully considering this problem, it has occurred to me that dis-engagement of the clutch could be arranged to cause throttling down and idling of the motor in such fashion as to prevent racing of the latter at all times. This would naturally save fuel and would especially increase the service given by the motor. As a result, I have succeeded in producing an automatic throttle control for a tractor, as will now be particularly described.

Figure 1:
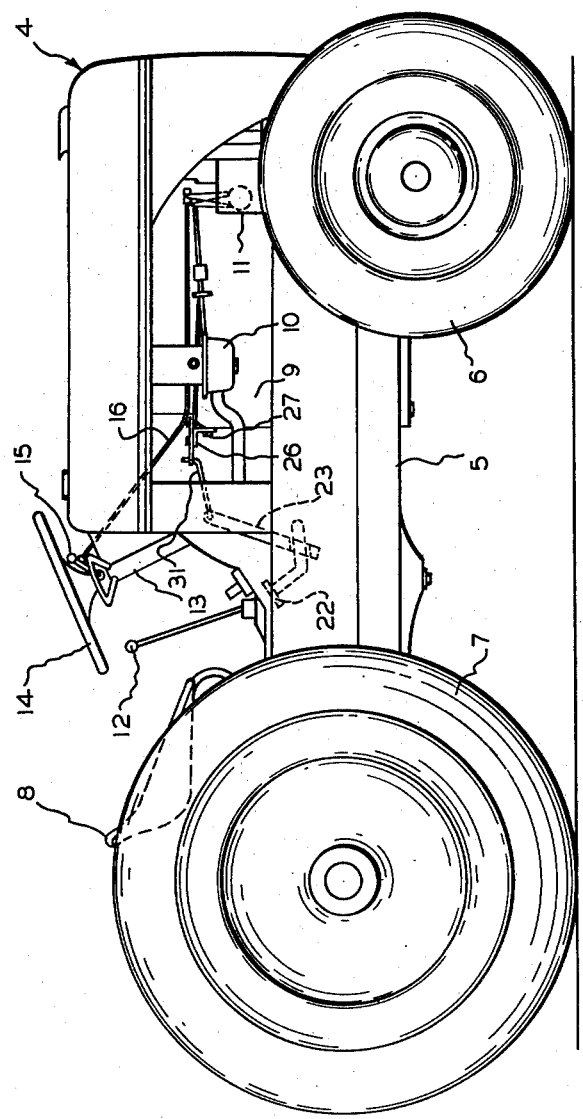
Figure 1 is a side elevation of a tractor as equipped with a throttle control device made according to the invention and embodying the same in a practical form.
Figure 2:
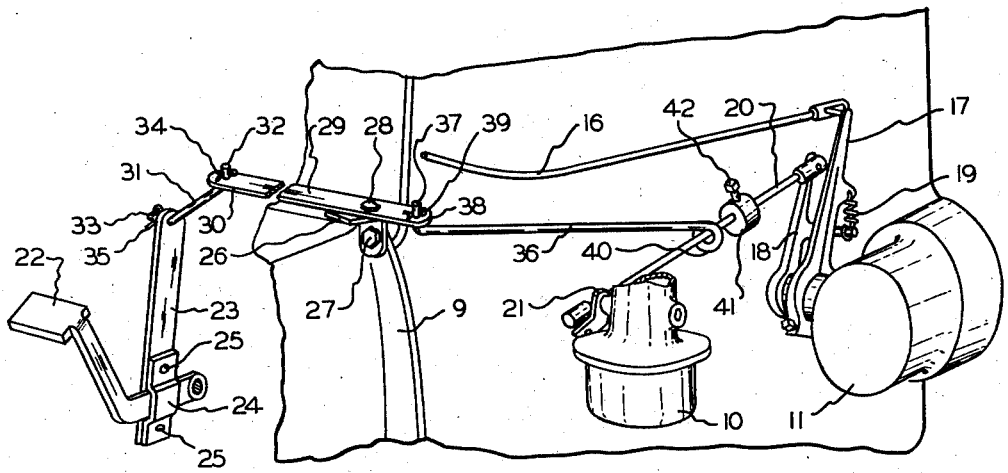
Figure 2 is an enlarged fragmentary elevation of certain operative portions of the tractor showing the device embodying the invention with particular reference to detail and in position ready to operate.
Figure 3:
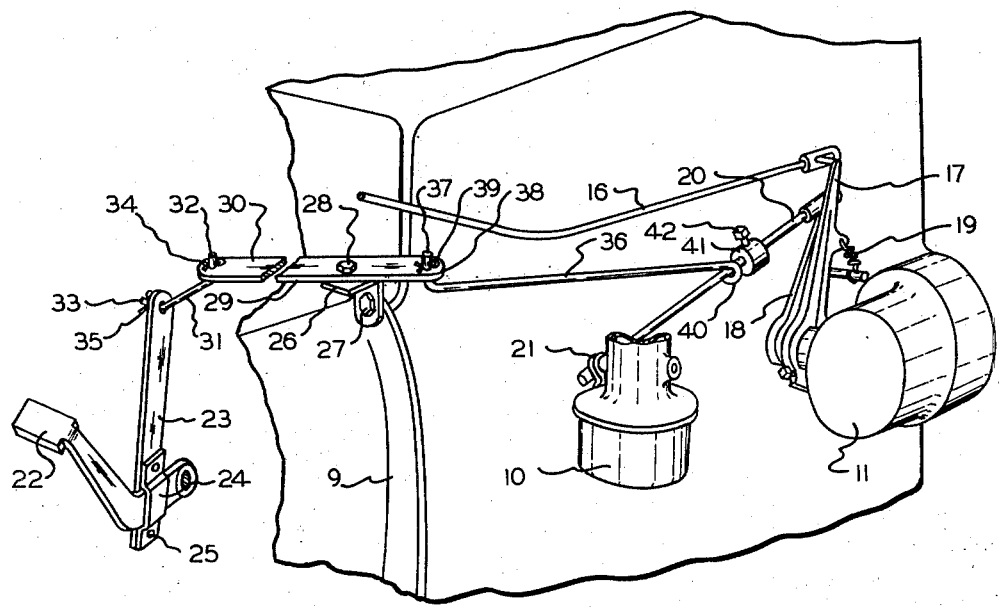
Figure 3 is another view of the same parts showing the device embodying the invention in operated position.

Hence, in the practice of my invention, and referring again to the drawings, a tractor, generally indicated at 4, has a frame 5, the front and rear wheels 6 and 7, the driver's seat 8, an engine 9 having a carburetor 10, a governor 11, a gear shift lever 12, steering post 13, surmounted by a steering wheel 14, and provided with a throttle control 15 connected by means of a rod or wire 16, to governor arm 17 of governor 11, as best seen in Figures 2 and 3.

A second arm 18 is also associated with the governor and connected by means of a tension spring 19, with the first mentioned governor arm 17 and also directly connected at its outer end by means of a rod or link 20, with the carburetor operating arm 21 serving to open or close the carburetor valve which is a more-or-less conventional construction and therefore not shown herein in detail. Likewise, within reach of the foot of the operator sitting on seat 8 is a clutch pedal 22 adapted upon depression thereof to dis-engage the clutch in more-or-less conventional manner. The construction, arrangement and operation of the parts so far enumerated are conventional and well-known on tractors and therefore superfluous to detail further, and hence, I shall now proceed to describe the invention as applied thereto.

Upon clutch pedal 22 is fixed an upwardly projecting arm 23 by means of a clamping plate 24 and bolts 25, 25 while to the engine casing 9 is fixed an angle member or bracket 26 by means of a screw or bolt 27 and having a pivot 28 secured thereto by which to pivotally mount a lever 29 thereon. The inner or rear end 30 of lever 29 is connected by means of link 31 to the upper end of arm 23 just described, the angularly bent ends 32, 33 of link 31 extending through holes in the ends of the lever and arm thus connected and being held in place by cotter pins 34, 35.

A second rod or link 36 has a rear upwardly bent end 37 extending pivotally through the forward or outer end 38 of lever 29 and is retained in place by a cotter pin 39 while the forward end of the same rod is formed into an eye or loop 40 enveloping the carburetor operating rod 20. In order to cooperate with the rod 36 a stop collar 41 is adjustably fixed upon rod 20 by means of a set screw 42 in such position that normally a short distance intervenes between the eye or ring 40 of rod or link 36 and the collar as especially noticeable in Figure 2 wherein all the parts are idle. The arrangement is such that when clutch pedal 22 is depressed arm 23 thereon is partly rotated counter-clockwise exerting a pull on rod 31 which consequently rotates lever 29 counter-clockwise which brings the end 38 thereof forward and pushes rod 36 forward along carburetor control rod 20 until ring 40 strikes collar 41.

When pedal 22 is depressed sufficiently to release or disengage the clutch, the end ring 40 of rod 36 will push the carburetor operating rod forward by engaging against collar 41 in such fashion as to operate the carburetor arm 21 and effect a closing movement of the carburetor valve, and simultaneously rotate arm 18, associated with the governor, clockwise against the operation of said governor with the result that the air and fuel mixture normally fed to the engine will be curtailed to the extent of causing the engine to slow down and idle as long as pedal 22 is depressed. Normally when the rod 16 is operated by throttle 15 to move governor arm 17 counter-clockwise, the spring 19 connecting this arm with arm 18 would tend to draw the latter counter-clockwise in the same direction and thereby further open the carburetor valve by operating the carburetor arm 21 rearwardly clockwise but the operation of the present device by means of arm 23 on pedal 22 will cause the ring 40 on arm 36 to push the mentioned collar 41 forward against the tension of spring 19 and the normal operation of the governor 11 to effect idling of the motor as already mentioned.

Manifestly variations may be resorted to and parts and features may be modified or used without others within the scope of the appended claims.

Having now fully described my invention, I claim:

1. For combination with a tractor having an engine or motor with a carburetor and an operating arm on the latter to open and close the valve thereof, a clutch pedal for disengaging the clutch of the tractor upon depression of said pedal, a governor associated with the motor and having a governor arm, a second arm associated with the governor and provided with a resilient connection to the governor arm so that operation of the latter will tend to cause operation of the second arm, a carburetor control rod or link connecting said second arm with the carburetor operating arm, a steering post on said tractor carrying a throttle member, and a wire or rod interconnecting the throttle member with the first-mentioned governor arm, the provision of a mechanism adapted for connection between the clutch pedal and the throttle actuator to synchronize the clutch pedal movement with the throttle such that the tractor engine is automatically throttled-down to an idled condition when the clutch is disengaged without disturbing the initial hand setting of the throttle, which is free to reestablish the originally set throttle position when the clutch is again engaged, said mechanism comprising the combination of an upwardly directed arm adapted to be rigidly mounted upon the clutch pedal, an angle member or bracket adapted to be fixed on the tractor, a lever pivotally mounted intermediate the ends thereof upon the bracket, a rod forming a link adapted to be pivotally connected at one end to the end of the arm on the clutch pedal and at the other end pivotally connected to the inner or rear end of the last-mentioned lever, a second rod pivotally connected at the rear end thereof to the other end of the latter lever, an eye or ring loop integral upon the other end of the second rod and adapted loosely to surround the carburetor control rod, an adjustable stop member adapted to be fitted on the rod intermediate the connection thereof with the second arm associated with the governor and the eye on said second rod normally spaced a predetermined distance from the latter, and a set screw on the stop member for fixing the stop member on the rod in position to be pushed by said eye when the clutch pedal is depressed to disengage the clutch.

2. For use in combination with a tractor having an engine or motor with a carburetor and an operating arm on the latter to open and close the valve thereof, a clutch pedal for disengaging the clutch of the tractor upon depression of said pedal, a governor associated with the motor and having a governor arm, a second arm associated with the governor and provided with a resilient connection to the governor arm so that operation of the latter will tend to cause operation of the second arm, a carburetor control rod or link connecting said second arm with the carburetor operating arm, a steering post on said tractor carrying a throttle member, and a wire or rod interconnecting the throttle member with the first-mentioned governor arm, the provision of a mechanism adapted for connection between the clutch pedal and the throttle actuator to synchronize the clutch pedal movement with the throttle such that the tractor engine is automatically throttled-down to an idled condition when the clutch is disengaged without disturbing the initial hand setting of the throttle, which is free to reestablish the originally set throttle position when the clutch is again engaged, said mechanism comprising the combination of an upwardly directed arm adapted to be rigidly mounted upon the clutch pedal, an angle member or bracket adapted to be fixed on the tractor, a lever pivotally mounted intermediate the ends thereof upon the bracket, a rod forming a link pivotally connected at one end to the end of the arm on the clutch pedal and at the other end pivotally connected to the inner or rear end of the last-mentioned lever, a second rod pivotally connected at the rear end thereof to the other end of the latter lever, and means adapted to form a lost motion connection between the other end of the second rod and the carburetor control rod effective to operate the latter when the clutch pedal is depressed to disengage the clutch.

3. For use in combination with a tractor having an engine or motor with a carburetor and an operating arm on the latter to open and close the valve thereof, a clutch pedal for disengaging the clutch of the tractor upon depression of said pedal, a governor associated with the motor and having a governor arm, a second arm associated with the governor and provided with a resilient connection to the governor arm so that operation of the latter will tend to cause operation of the second arm, a carburetor control rod or link connecting said second arm with the carburetor operating arm, a steering post on said tractor carrying a throttle member, and a wire or rod interconnecting the throttle member with the first-mentioned governor arm, the provision of a mechanism adapted for connection between the clutch pedal and the throttle actuator to synchronize the clutch pedal movement with the throttle such that the tractor engine is automatically throttled-down to an idled condition when the clutch is disengaged without disturbing the initial hand setting of the throttle, which is free to reestablish the originally set throttle position when the clutch is again engaged, said mechanism comprising in combination, an arm mounted upon said clutch pedal for actuation thereby, means defining a pivot point and supported by the tractor structure, a lever pivotally mounted intermediate its ends at said pivot point upon said means, linkage means supported by said arm and one end of said lever and adapted to interconnect said arm and said lever in an operative connection, a rod mounted at one of its ends on the second end of said lever, and means adapted to form a lost motion connection between the other end of said rod and said carburetor control rod effective to operate the latter when said clutch pedal is depressed to disengage the clutch.

LEO SOBIE.

REFERENCES CITED

The following references are of record in the file of this patent:

UNITED STATES PATENTS

| Number | Name | Date |
|---|---|---|
| 1,194,479 | Clay et al. | Aug. 15, 1916 |
| 1,620,763 | Hull | Mar. 15, 1927 |
| 1,620,764 | Hull | Mar. 15, 1927 |
| 2,167,110 | Gutenberg et al. | July 25, 1939 |
| 2,283,478 | Warren | May 19, 1942 |